June 21, 1932. J. J. ENGELMAN 1,864,419
MACHINE FOR SOLDERING SIDE SEAMS OF CAN BODIES
Filed Jan. 7, 1931 6 Sheets-Sheet 4
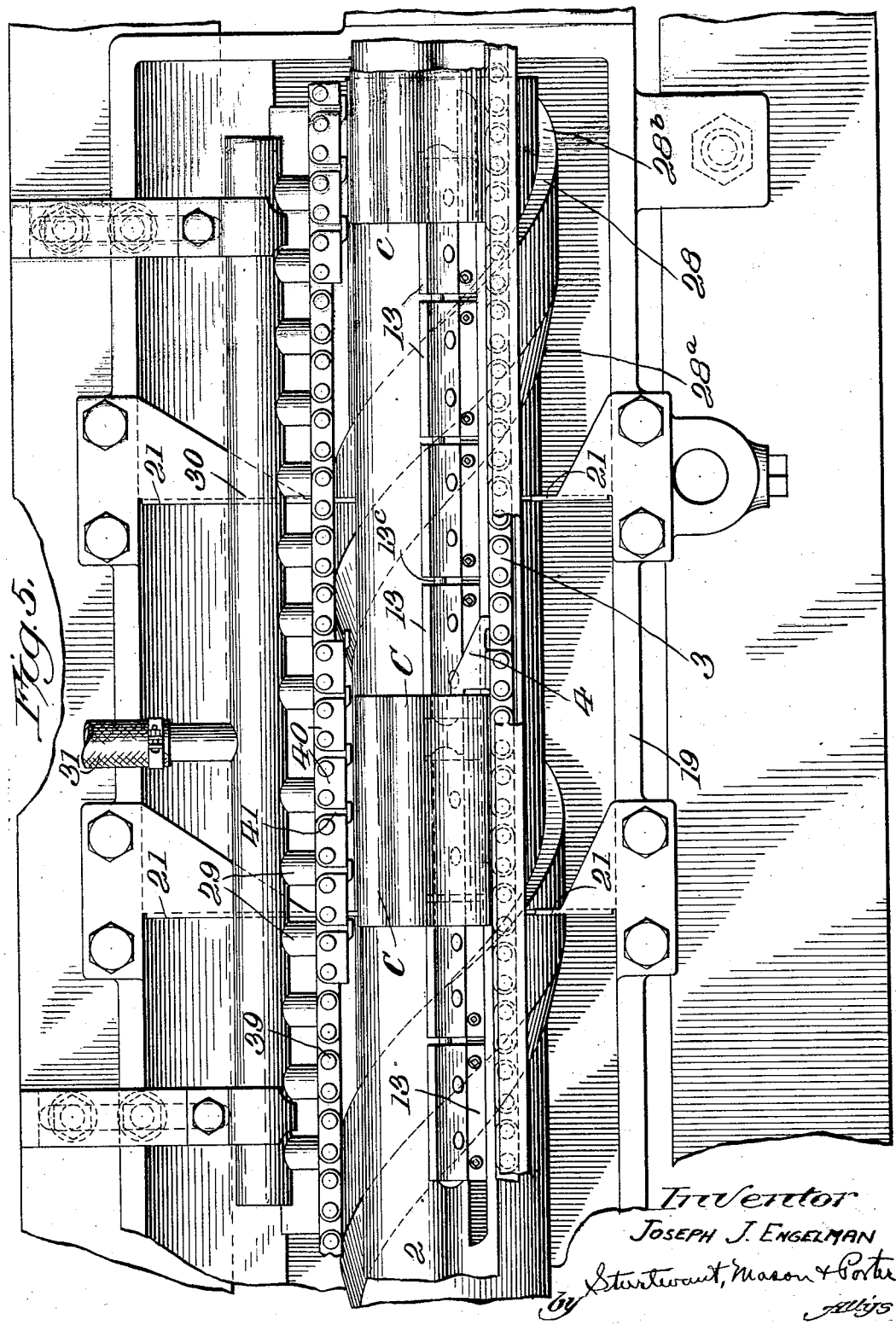
Inventor
JOSEPH J. ENGELMAN June 21, 1932.　　J. J. ENGELMAN　　1,864,419
MACHINE FOR SOLDERING SIDE SEAMS OF CAN BODIES
Filed Jan. 7, 1931　　6 Sheets-Sheet 5
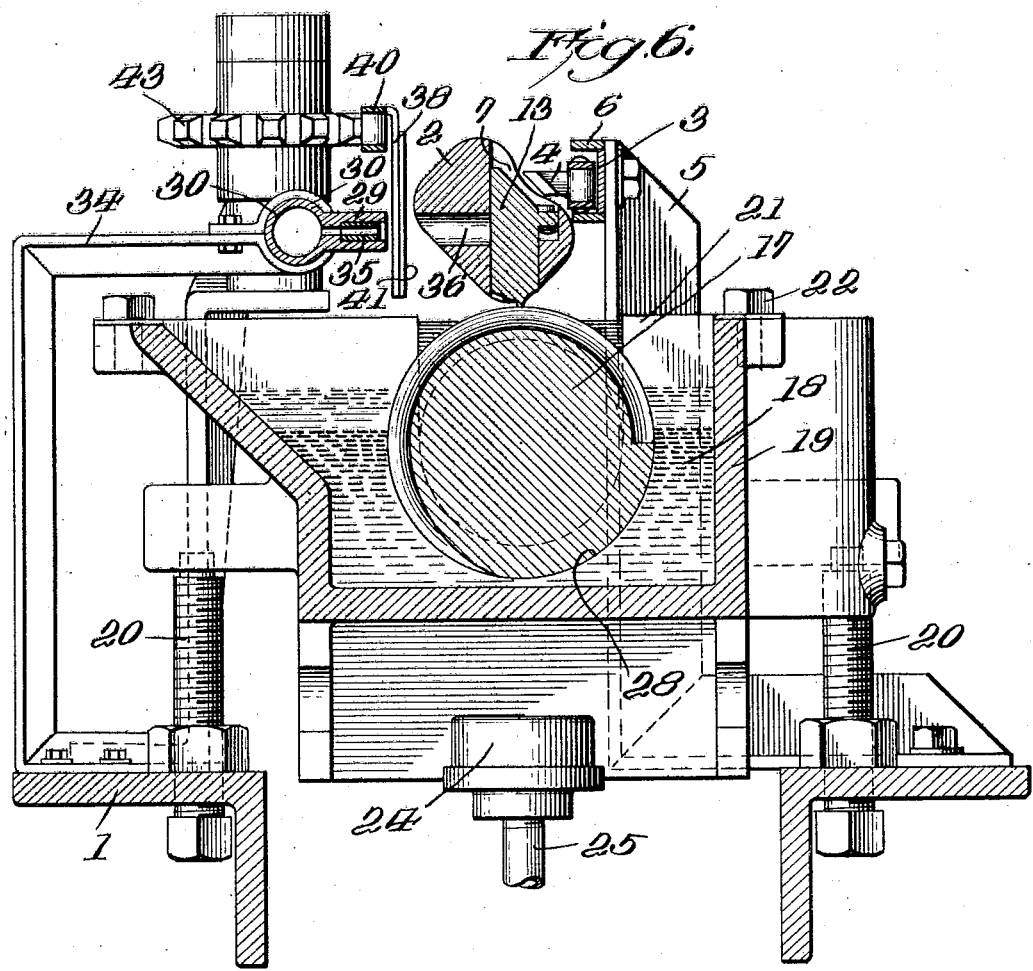
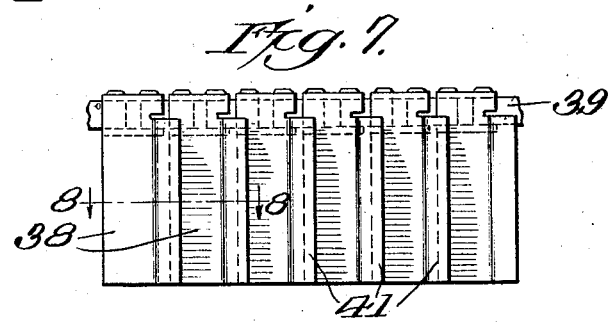
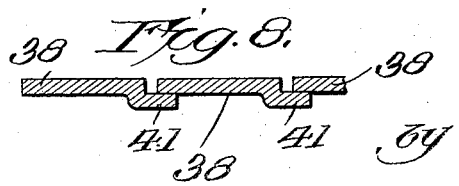
Inventor
Joseph J. Engelman
Sturtevant, Mason & Porter
Attys

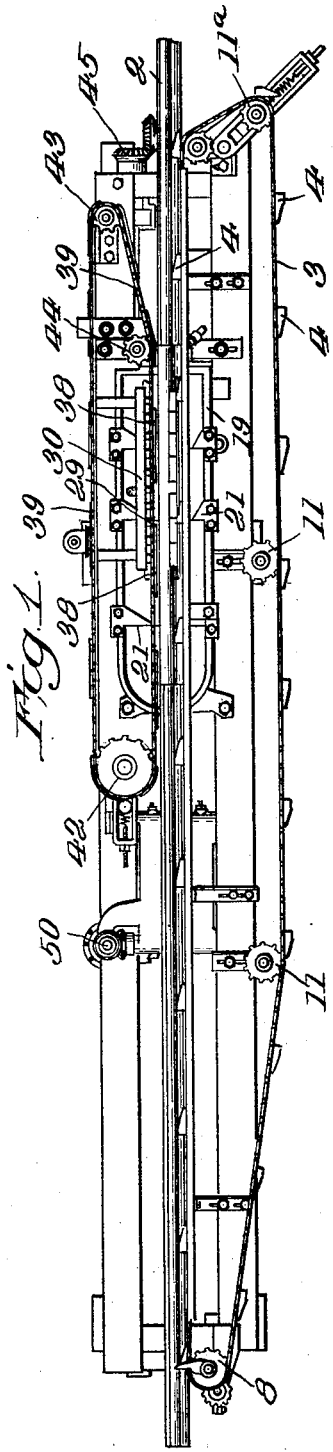

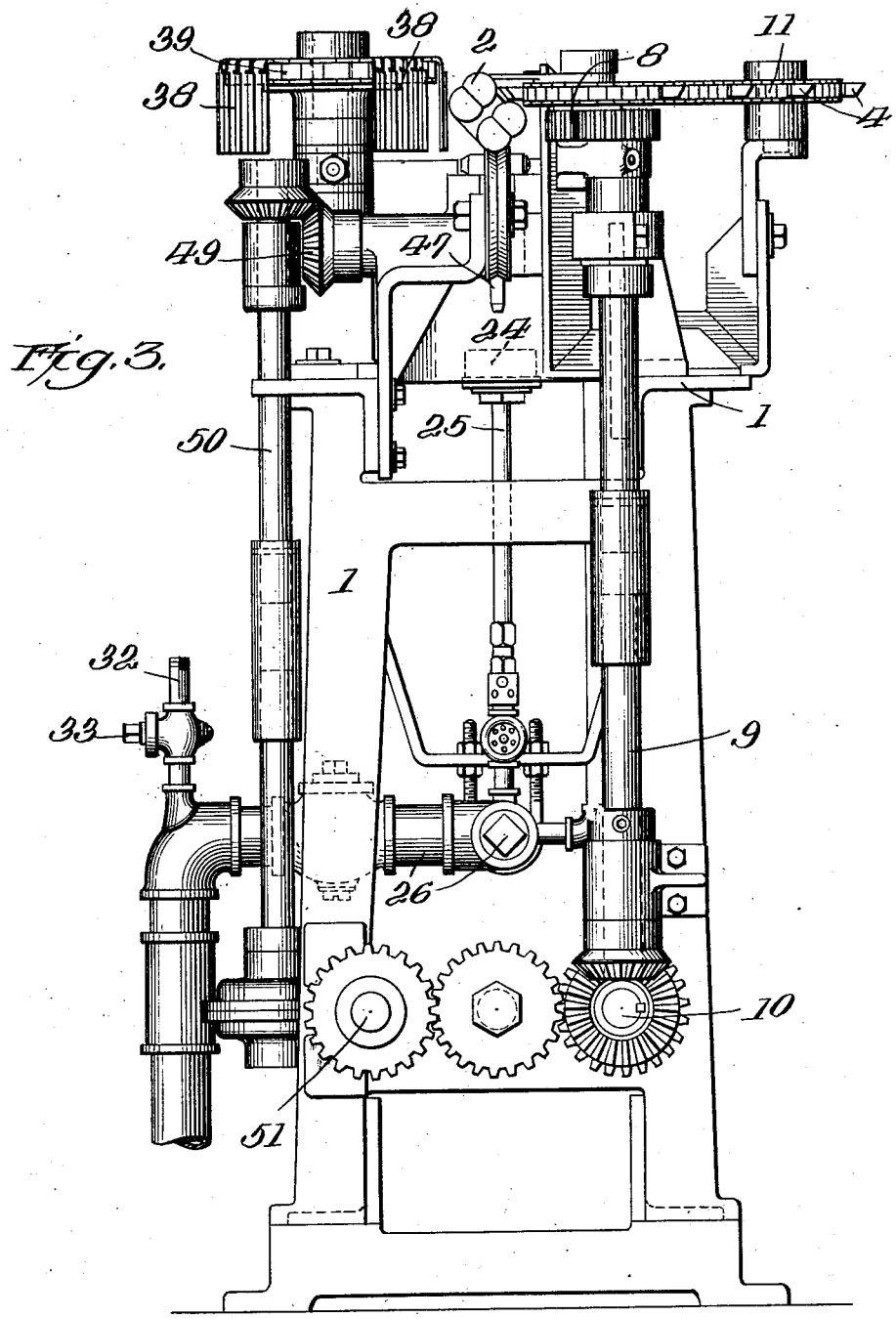

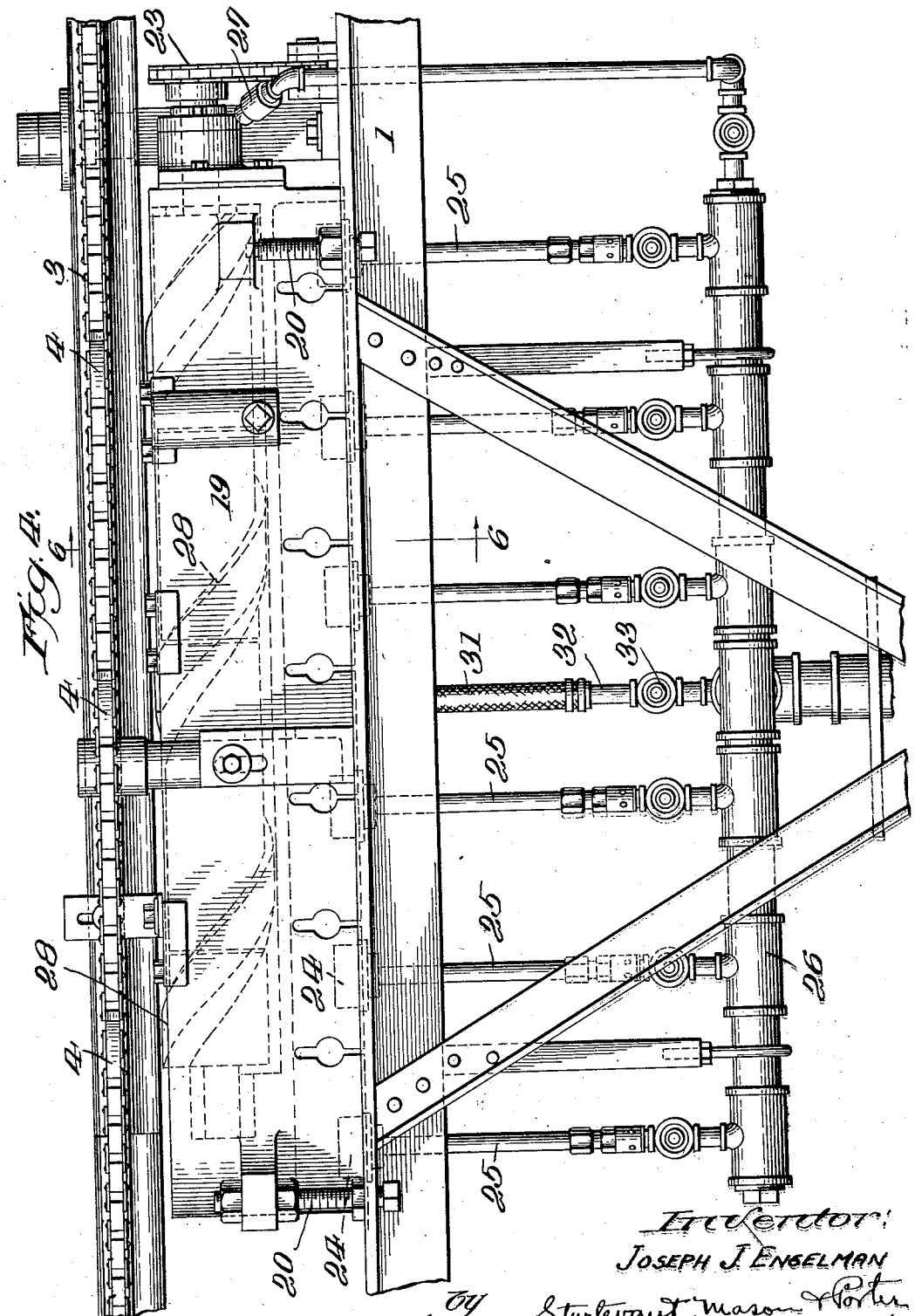

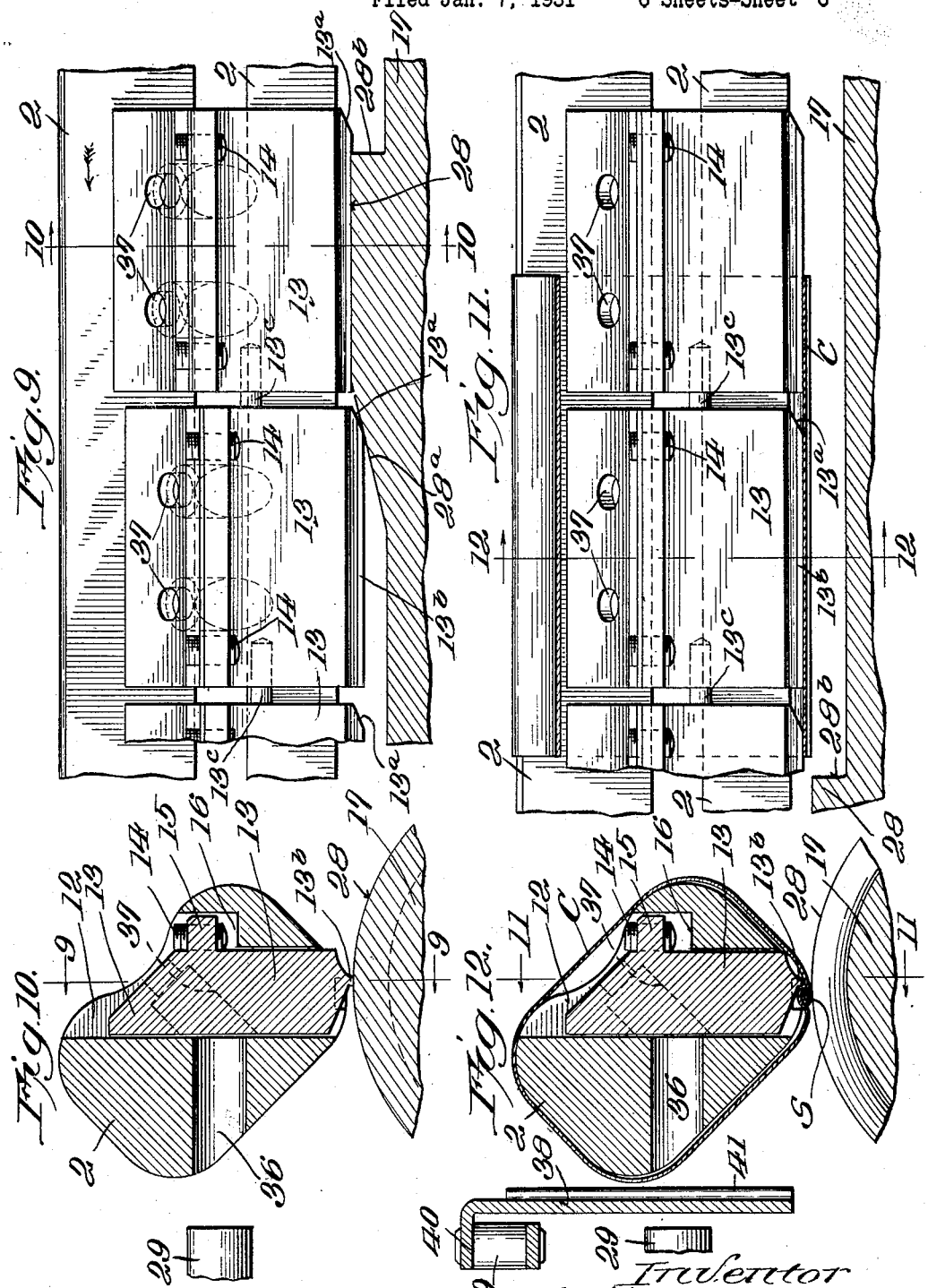

Patented June 21, 1932

1,864,419

UNITED STATES PATENT OFFICE

JOSEPH J. ENGELMAN, OF CHICAGO, ILLINOIS, ASSIGNOR TO CONTINENTAL CAN COMPANY, INC., OF NEW YORK, N. Y., A CORPORATION OF NEW YORK

MACHINE FOR SOLDERING SIDE SEAMS OF CAN BODIES

Application filed January 7, 1931. Serial No. 507,251.

The invention relates to new and useful improvements in a machine for applying a solder bond to the inside of a side seam in a can body. In the Patent No. 1,666,707, granted April 17, 1928, there is shown and described a soldering machine for applying solder to the inside of a side seam of a can body. The present invention relates to improvements in this prior machine, and an object of the invention is to provide a means for heating the soldering irons wherein the body of the can is protected from injury by the heating means.

A further object of the invention is to provide a machine of the above type with traveling shields which pass between the body of the can and the heating jets so as to prevent the heating jets from striking the body of the can as it passes through the soldering machine.

A still further object of the invention is to provide a machine of the above type wherein the soldering irons are so constructed as to have a limited lateral contact with the side seam so as to avoid the injuring of the lacquered body wall in the region of the side seam through the heat radiating therefrom.

A still further object of the invention is to provide a machine of the above type wherein solder is applied to the irons prior to the can body passing over the irons by a solder roll running in a solder bath and having a spiral rib for contacting with the irons, and wherein the distance between the turns of the spiral ribs is greater than the length of the can body.

A still further object of the invention is to provide a machine of the above type wherein the solder bath is divided into sections by transverse partitions which prevent the solder and flux from being forced by the rotating rib to the end of the bath, and thus producing an uneven level in the solder bath.

These and other objects will in part be obvious and will in part be hereinafter more fully disclosed.

In the drawings which show by way of illustration one embodiment of the invention—

Figure 1 is a plan view of a machine embodying the improvements;

Fig. 2 is a side view of the same;

Fig. 3 is an enlarged end view of the machine as viewed from the discharge end thereof;

Fig. 4 is an enlarged view of a portion of the machine showing the solder bath and the solder applying roll; also the inside horse and the means for feeding the cans along the same;

Fig. 5 is a plan view of a portion of the machine showing the solder bath, the soldering irons, the conveyor for the can bodies, and the shields for protecting the can bodies as they pass the heating jets;

Fig. 6 is an enlarged vertical sectional view on the line 6—6 of Fig. 4;

Fig. 7 is an enlarged detail in side view of the traveling shields;

Fig. 8 is a sectional view on the line 8—8 of Fig. 7;

Fig. 9 is an enlarged sectional view through a portion of the solder applying roll and showing the inside horse and certain of the soldering irons, the section being taken on the line 9—9 of Fig. 10, with the soldering irons in side view;

Fig. 10 is a sectional view on the line 10—10 of Fig. 9;

Fig. 11 is a longitudinal sectional view on the line 11—11 of Fig. 12, showing the soldering irons in side view, and Fig. 12 is a sectional view on the line 12—12 of Fig. 11.

In the Patent No. 1,666,707, there is shown and described a soldering machine for soldering can bodies wherein the solder is applied to the inside of the side seam of the can body. This is accomplished by soldering irons which are mounted on an inside horse along which the can bodies travel, and the can bodies, therefore, pass over the soldering irons. Solder is applied to the soldering irons by a rotating roll having a spiral rib or thread, which roll is wholly immersed in the solder bath. The spiral rib is constructed so that the distance between the turns thereof is greater than the length of the can body. The soldering irons are yieldingly mounted and of such length that they move down into contact with the rib and have solder applied thereto between the time at which the can body is passed over the iron. In other words, the can bodies are spaced in their path of travel a distance slightly greater than the width of this rib. The present invention has to do with improvements in this machine. One of the features of the present invention is the heating of the iron. This is accomplished by a series of gas jets which are disposed so as to direct the heating flame against the inside horse in the region where the irons are supported and against the iron so that the irons are kept hot by these heating jets. Inasmuch as the can body passes over the horse and the iron, means is provided for shielding the can body from these heating jets. This means consists of traveling shields which are of such width and location as to entirely cover the can body and form a protecting wall between the can body and the heating jets. These shields travel with the can bodies past the heating jets. Another feature of the present invention resides in the shaping of the iron so as to restrict the line of contact between the iron and the side seam, to protect, so far as possible, the decorated surface of the can body in the region of the side seam. Another feature of the present invention is directed to the providing of the solder bath with transverse partitions so as to prevent the solder from being moved to the end of the bath by the rotating spiral ribs therein.

The invention will possibly be better understood by a detail reference to the embodiment of the invention illustrated. The machine as a whole will be very briefly described in view of the fact that the present invention is an improvement on the machine which is fully shown and described in my prior patent. The machine consists of a supporting frame 1 carrying an inside solder horse 2 around which the can bodies are formed and along which they are moved through the soldering mechanism. The can bodies are conveyed along the horse by a traveling chain 3 having a series of spaced lugs 4, 4 which engage the can bodies and move them along the solder horse. The supporting frame 1 carries a series of upright members 5, 5 which in turn support a channel guide bar 6. The conveyor chain 3 travels along this channel guide bar 6 and is supported from sagging thereby, and the projecting lugs 4 travel along a recess or cut away portion 7 in the solder horse 2. Thus it is that the lug engages the end wall of the can body and slides the same along the solder horse. The conveyor chain is driven by a sprocket wheel 8 carried by a shaft 9, and the shaft 9 in turn is driven by a shaft 10 extending along the frame 1. Suitable idlers 11, 11 are provided over which the chain travels, and the idler 11ª is preferably mounted so as to take up the slack in the conveyor chain. The inside horse 2 is shown as substantially rectangular in cross section with rounded corners, as it is designed for container bodies or cans which are similarly shaped in cross section. In Fig. 12, a container body is shown mounted on the horse for soldering.

The horse is provided with a vertical recess 12 in which is mounted a series of solder irons 13. The side walls of the recess are substantially parallel, and the irons are mounted in this recess so that they are free to move vertically. Each iron is provided with two adjustable stop screws 14, 14. These stop screws are threaded through a projecting member 15 in the iron and extend below said projecting member. The stop screws are adapted to engage with the bottom wall 16 of a recess in the solder horse 2. The purpose of these stop screws is to limit the downward movement of the irons. They move downward by gravity and are adapted to be raised in a manner that will be hereinafter described. Carried by each arm is a pin 13°. This pin is rigidly supported by the iron carrying the same and bears freely against the next adjacent iron and can make sliding contact therewith. The purpose of these pins is to space the irons from each other.

Solder is applied to the irons by a solder applying roll 17. This solder applying roll 17 is mounted for rotation in a solder bath 18 contained in a tank 19. This tank for the solder bath is mounted on adjustable screws 20, 20, so that the entire solder bath and the solder applying roll may be raised and lowered to various set positions. The solder bath is divided into sections by transverse partitions 21 which are secured to the wall of the tank by suitable clamping bolts 22. The solder roll is mounted in suitable bearings in the wall of the tank and is driven by a sprocket chain 23. The tank is heated by means of burners 24, 24. There are a series of these burners along the tank, and each burner is supplied with gas by means of pipes 25, 25 connected to a main supply pipe 26. There is also a burner 27 adjacent the bearing at the driven end of the solder roll. The solder roll is provided with a spiral rib 28. This spiral rib is formed on the roll so that the distance between the rib is greater than the length of a can body. The can bodies are indicated in the drawings at C, and the side seam which is to be soldered at S. This spiral rib has the side thereof opposite the path of travel of the cans inclined as indicated at 28ª. The other side of the rib is substantially vertical as indicated at 28ᵇ. The end of each soldering iron 13 is tapered as indicated at 13ª. These soldering irons do not travel, but they are capable of vertical movement. As the solder roll rotates, the spirally laid rib will make contact with the tapered end of the soldering iron which will slide up the incline 28ª. The rib will supply solder to the soldering iron as it moves across the lower edge of the soldering iron contacting therewith. The solder, of course, is supplied to the solder roll from the bath and is handed up by this solder roll to the soldering irons. The can body to be soldered is timed so that it is fed along the horse and over the soldering iron, following the travel of the helical rib across the face of the soldering iron, and thus it is that the soldering iron is directed into the can body and the can body moved across the iron while the lower edge thereof makes contact with the side seam S. This applies the solder to the inside of the side seam of the can body.

The purpose of the partitions in the solder bath is to prevent this helical rib from forcing or feeding the solder toward the end of the tank. The partitions maintain a substantially uniform level of the solder. They are cut away in the region of the travel of the spiral rib so as not to interfere, in any way, with the movement of the solder roll.

The soldering irons are provided with a relatively narrow projecting portion 13$^b$ which slides along the side of the interfolded parts of the side seam and supplies solder so that it will flow into the interfolded parts. The region of contact between the solder iron and the can body is limited, so that the heat radiating from the iron will have little or no effect on the outer lacquered faces of the can body adjacent the side seam.

The irons are heated by heating jets which are directed against the iron and the side face of the solder horse. The heating jets are indicated in Figure 5 at 29. There is a series of these jets. They are carried by a header or pipe 30 which is supplied with the heating fuel, preferably gas, through a pipe 31. The pipe 31 is connected to a supply pipe 32 controlled by a valve 33 and connected to the main supply pipe 26 (see Fig. 3). The pipe 31 is preferably a flexible pipe. The header 30 carrying the gas jets 29 is mounted in a bracket 34 which is attached to the frame of the machine 1 by suitable bolts, and said bracket projects upwardly and overhangs the edge of the tank. Each gas jet is provided with a suitable gas nipple 35 (see Fig. 6). The solder horse is provided with a slot 36 and this slot is in alinement with the gas jets 29 so that the gas flame will be directed against the side of the horse and into this slot 36. This leads the gas flame directly against the side face of the solder irons 13. Each solder iron is preferably provided with upwardly inclined openings 37. There are two of these openings, and they register with this slot 36 and provide a means whereby the heated gases may be carried into and through the iron to aid in the heating of the iron. From the above it will be apparent that the irons are heated independently of the heat imparted thereto by the application of the molten solder to the irons, and this greatly increases the efficiency of the application of the solder bond to the side seam.

Inasmuch as the can bodies slide over the horse 2, unless some means is provided for protecting the can body, it will pass directly through the heating flame, and this would be likely to injure any decorated surface on the outside of the can body. In order to avoid this, I have provided a series of traveling shields 38. These traveling shields are in the form of flat plates. The shields are supported by a traveling chain 39. Each shield plate has a laterally projecting portion 40 at the upper edge thereof which serves as the connecting link in the chain. The shields are placed side by side on the chain, and at one side of the plate forming the shield 38 is an offset portion 41 which overlaps the edge portion of the next adjacent shield. When the shields are passing along the straight run of the chain, they form a closed wall with no space between the adjacent shields. These shields can travel around the sprocket wheel carrying the chain, as clearly shown in Figure 3 of the drawings. The shields are positioned so that they pass between the gas jets 29 and the horse 2. The chain carrying the shields is timed so that the shields will move with the can body in timing therewith, and will cut off the gas jets so that they strike the outer face of the shields and do not strike the face of the can body. This provides an efficient means for protecting the can body as it travels along the horse and prevents the flames of the gas jets from striking the can body. The shields are spaced the same as the can bodies are spaced in their travel, and after the shield passes the gas jets, the flames will engage the solder irons and heat the same.

The traveling chain 39 for the shields passes around a sprocket wheel 42, also around a sprocket wheel 43 and around a sprocket wheel 44, which directs the travel of the chain so that the shields will pass between the gas jets and the can body. The sprocket wheel 43 is driven from a shaft 45 which receives movement from a shaft 46. The sprocket wheel 42 is mounted for sliding movement so as to take up the slack in the traveling chain 39.

The inside horse rests on a series of traveling supports 47 carried by a chain 48. These supports are spaced a sufficient distance to allow the can to pass, as one support after another comes into contact with the solder horse and supports the same. This chain carrying the supports 47 moves in a counterclockwise direction. as viewed in Figure 2. The chain is driven by a shaft 49 which in turn is operated by a vertical shaft 50. The shaft 50 is driven from a shaft 51, which in turn is geared to the shaft 10. As the can bodies pass along the inside horse 2, there is a preliminary heating of the side seam by a burner 52 connected by a pipe 53 to the main supply pipe.

From the above it will be apparent that the can bodies after they are formed and the side edges thereof folded and interlocked, are fed endwise along the inside horse by a traveling series of dogs which engage the can bodies one after another and move the same along the horse in spaced relation to each other. As the can bodies travel they will pass over the soldering irons which in turn pass through the can bodies by the movement of the can body. The soldering irons are supplied with solder from the roll turning in the solder bath and through the contact of the irons with the spiral rib on the solder roll at the time interval between the passing of the can bodies. The irons are capable of yielding so as to make contact with the rib and then pass into the can body where they rest on the side seam and apply the solder thereto. The irons are heated by gas flames and the body of the can is protected by the traveling shields which move in timing with the can bodies and which pass between the jets and the inside horse, so as to receive the flame from the gas jets and keep the flame from contacting with the outer face of the can body. The space between the shields is sufficient to permit the flames to contact with the iron at the time interval between the passing can bodies for heating the same. By dividing the solder bath into sections through the use of the cross partitions, the turning of the solder roll with this projecting helical rib, does not disturb the level of the solder bath which remains substantially constant, and this insures a uniform application of solder to the soldering irons.

While the invention has been shown as applied to a machine for soldering the side seams of irregular shaped can bodies, it will be understood that it may also be applied to the soldering of cylindrical can bodies. The only change necessary is in the shaping of the inside horse and the soldering irons.

It will be obvious that minor changes in the details of constructon and arrangement of the parts may be made without departing from the spirit of the invention as set forth in the appended claims.

Having thus described the invention, what I claim as new and desire to secure by Letters Patent, is—

1. A soldering machine for can bodies comprising an inside supporting horse, soldering irons carried thereby over which the can bodies are passed for applying solder to the side seam, a series of gas jets for applying heat to the soldering irons, and means movable with the can bodies for shielding the can bodies from the flame of the gas jets while passing the same.

2. A soldering machine for can bodies comprising an inside supporting horse, soldering irons carried thereby over which the can bodies are passed for applying solder to the side seam, a series of gas jets for applying heat to the soldering irons, and a series of traveling shields passing between the jets and the can body for protecting the can body while passing over the soldering irons.

3. A soldering machine for can bodies comprising an inside supporting horse, soldering irons carried thereby over which the can bodies are passed for applying solder to the side seam, a series of gas jets arranged alongside of said soldering horse and directing a heating flame against the side of the horse and the sides of the irons for heating said irons, and a series of traveling shields passing between the gas jets and the can body for preventing the flame from striking the can bodies as they pass over the soldering irons.

4. A soldering machine for can bodies comprising an inside supporting horse, soldering irons carried thereby over which the can bodies are passed for applying solder to the side seam, a series of gas jets arranged alongside of said soldering horse and directing a heating flame against the side of the horse and the sides of the irons for heating said irons, a series of traveling shields passing between the gas jets and the can body for preventing the flame from striking the can bodies as they pass over the soldering irons, said shields comprising a series of plates having overlapping portions at the adjacent sides thereof, and a traveling chain supporting and carrying said plates.

5. A soldering machine for can bodies comprising an inside supporting horse, soldering irons carried thereby over which the can bodies are passed for applying solder to the side seam, a series of gas jets arranged along one side of said horse for directing the flame against the side of the horse and the sides of the soldering irons for heating the same, an endless chain moving in a horizontal plane and passing above and parallel with the horse in the region of the gas jets, shields fixed to the links of said chains and having overlapping side portions whereby said shields form a substantially solid wall between the gas jets and the can body as the can body passes over the soldering irons.

6. A soldering machine for can bodies comprising an inside supporting horse, soldering irons carried thereby over which the can bodies are passed for applying solder to the side seam, a solder bath beneath said soldering irons, a solder roll associated with said solder bath and having a helical rib contacting with the irons for applying solder thereto, said helical rib having the turns thereof spaced a greater distance than the length of the can body, a series of gas jets for heating the irons, and means traveling with the can bodies for shielding the can bodies from the flames as said can body passes over said irons.

7. A soldering machine for can bodies comprising an inside supporting horse, soldering irons carried thereby over which the can bodies are passed for applying solder to the side seam, a solder bath beneath said soldering irons, a solder roll associated with said solder bath and having a helical rib contacting with the irons for applying solder thereto, said helical rib having the turns thereof spaced a greater distance than the length of the can body, and a series of traveling shields having overlapping portions at their adjacent edges for forming the wall between the can body and the gas jets while the can bodies are passing over the soldering irons.

In testimony whereof, I affix my signature.

JOSEPH J. ENGELMAN.